(12) United States Patent
O'Niell et al.

(10) Patent No.: US 8,424,017 B2
(45) Date of Patent: Apr. 16, 2013

(54) EMBEDDING PROCESS IDENTIFICATION INFORMATION IN A PATHNAME TO INDICATE PROCESS STATUS

(75) Inventors: Abigail Ann O'Niell, Bedford, MA (US); Daniel P Ottavio, Watertown, MA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/770,834

(22) Filed: Apr. 30, 2010

(65) Prior Publication Data

US 2011/0271087 A1 Nov. 3, 2011

(51) Int. Cl.
*G06F 9/54* (2006.01)
*G06F 15/163* (2006.01)
*G06F 13/00* (2006.01)

(52) U.S. Cl.
USPC ........... 719/313; 719/314; 719/315; 719/316; 719/317

(58) Field of Classification Search .................. None
See application file for complete search history.

(56) References Cited

U.S. PATENT DOCUMENTS

| | | |
|---|---|---|
| 7,051,108 B1 | 5/2006 | Jones |
| 2008/0155103 A1 | 6/2008 | Bailey |
| 2008/0270829 A1 | 10/2008 | Craft |

OTHER PUBLICATIONS

Chebrolu—"Socket Programming"; Dept of Electrical Engineering, IIT Kanpur (downloaded from http://home.iitk.ac.in/~chebrolu/scourse/slides/sockets-tutorial.pdf on Jan. 27, 2010).
Makholm—"What the Hedgehog Sang, Unix Socket Domain Woes" (Jun. 10, 2008).
Perl—"Perl Cookbook", Chapter 17, Sockets—Using Unix Domain Sockets (downloaded from http://docstore.mik.ua/orelly/perl/cookbook/ch17_07.htm on Jan. 27, 2010).
Stover—"Demystifying Unix Domain Sockets", downloaded from http://www.wsinnovations.com/softeng/articles/uds.html (Feb. 2006).
Sun—"Programming Interfaces Guide", Sun Microsystems, Inc (2009).
Watson—"Unix Domain Sockets vs Internet Sockets" (Feb. 25, 2005).
WIKI1—"Unix Domain Socket", (downloaded from http://en.wikipedia.org/wiki/Unix_domain_socket on Jan. 27, 2010).
WIKI2—"File Descriptor", (downloaded from http://en.wikipedia.org/wiki/File_descriptor on Jan. 27, 2010).

*Primary Examiner* — Qing Wu
(74) *Attorney, Agent, or Firm* — David Mims; Mark P. Kahler

(57) ABSTRACT

The method determines whether a particular process is currently executing or not executing. The method embeds process identification information and a process name in a process pathname that binds to a socket. The method creates a socket and binds to the socket a process name and associated process identifier if that process is currently executing. A status file may store the socket pathnames of those processes currently executing. A socket pathname appears in the status file if a corresponding process is executing, but does not appear in the status file if the process is not executing. To determine if a particular process is currently executing, the method tests the status file to determine if the status file contains a match for the socket pathname associated with the particular process under test. The presence of a match for the socket pathname in the status file indicates that the particular process associated therewith is currently executing.

20 Claims, 4 Drawing Sheets

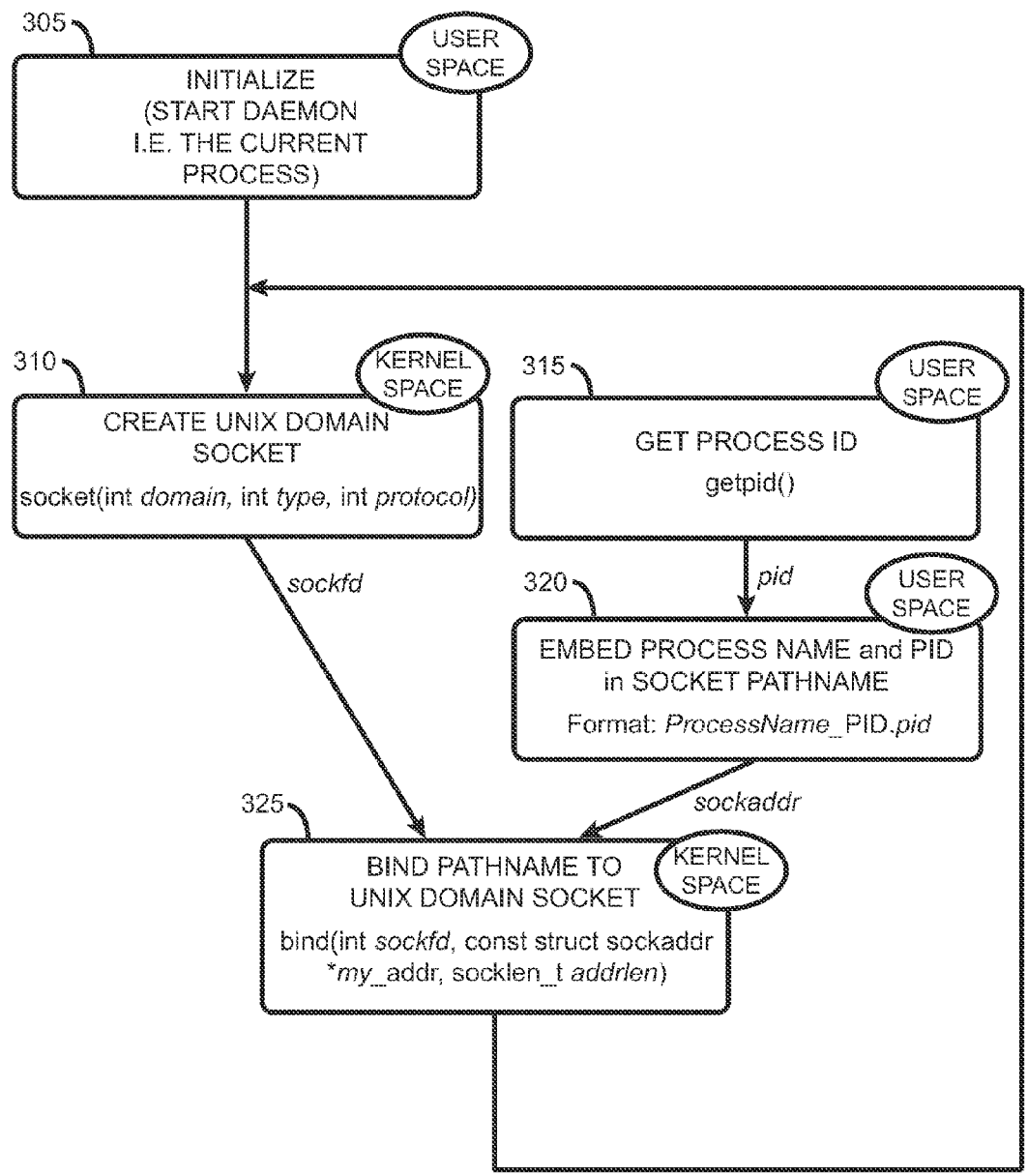

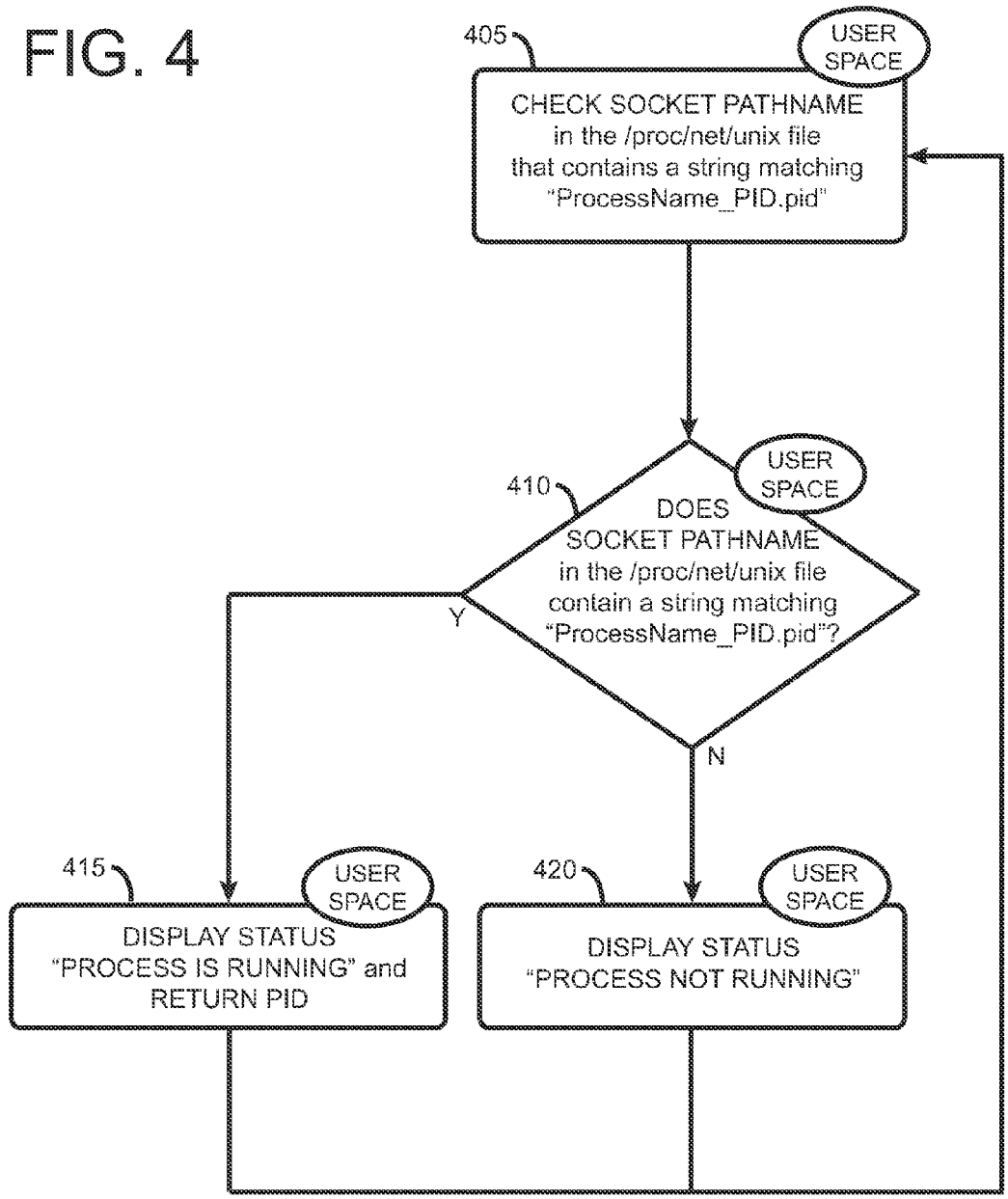

US 8,424,017 B2

EMBEDDING PROCESS IDENTIFICATION INFORMATION IN A PATHNAME TO INDICATE PROCESS STATUS

BACKGROUND

The disclosures herein relate generally to information handling systems (IHSs), and more specifically, to processes that execute in information handling systems.

Information handling systems (IHSs) include operating systems that execute many useful applications and processes. Processes may have process identifiers or process IDs associated therewith. It is often useful to know whether a particular process is a current process or a stale process. A current process is a process that is currently executing and valid. A stale process is a process that is no longer current or valid.

BRIEF SUMMARY

In one embodiment, a method of determining process status is disclosed. The method includes executing, by an operating system (OS) of an information handling system (IHS), an application that launches a particular process. The method also includes creating a socket, by the OS of the IHS, in response to the launch of the particular process, thus associating the socket with the particular process. The method further includes activating a process ID embedding handler in response to creating the socket, the process ID embedding handler determining a process ID for the particular process. The process ID embedding handler embeds a process name and the process ID in a socket pathname to form an embedded pathname. The method still further includes binding the embedded pathname to the socket.

In another embodiment, an information handling system (IHS) is disclosed. The IHS includes a processor. The IHS also includes a memory coupled to the processor. The memory is configured with an application that launches a particular process and creates a socket in response to launch of the particular process, thus associating the socket with the particular process. The memory is also configured with a process ID embedding handler wherein in response to creating the socket the process ID embedding handler determines a process ID for the particular process, the process ID embedding handler embedding a process name and the process ID in a socket pathname to form an embedded pathname. The memory is further configured to bind the embedded pathname to the socket.

In yet another embodiment, a computer program product is disclosed. The computer program product includes a computer readable storage medium. The computer program product includes first program instructions that execute an application that launches a particular process. The computer program product also includes second program instructions that create a socket in response to the launch of the particular process, thus associating the socket with the particular process. The computer program product further includes third program instructions that activate a process ID embedding handler in response to creating the socket, the process ID embedding handler determining a process ID for the particular process, the process ID embedding handler embedding a process name and the process ID in a socket pathname to form an embedded pathname. The computer program product also includes fourth program instructions that bind the embedded pathname to the socket. In this embodiment, the first, second, third and fourth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 is a flowchart of one embodiment of the disclosed socket naming methodology.

FIG. 4 is a flowchart of an embodiment of the disclosed socket naming methodology to distinguish the current status of a particular process.

DETAILED DESCRIPTION

Figure 1:
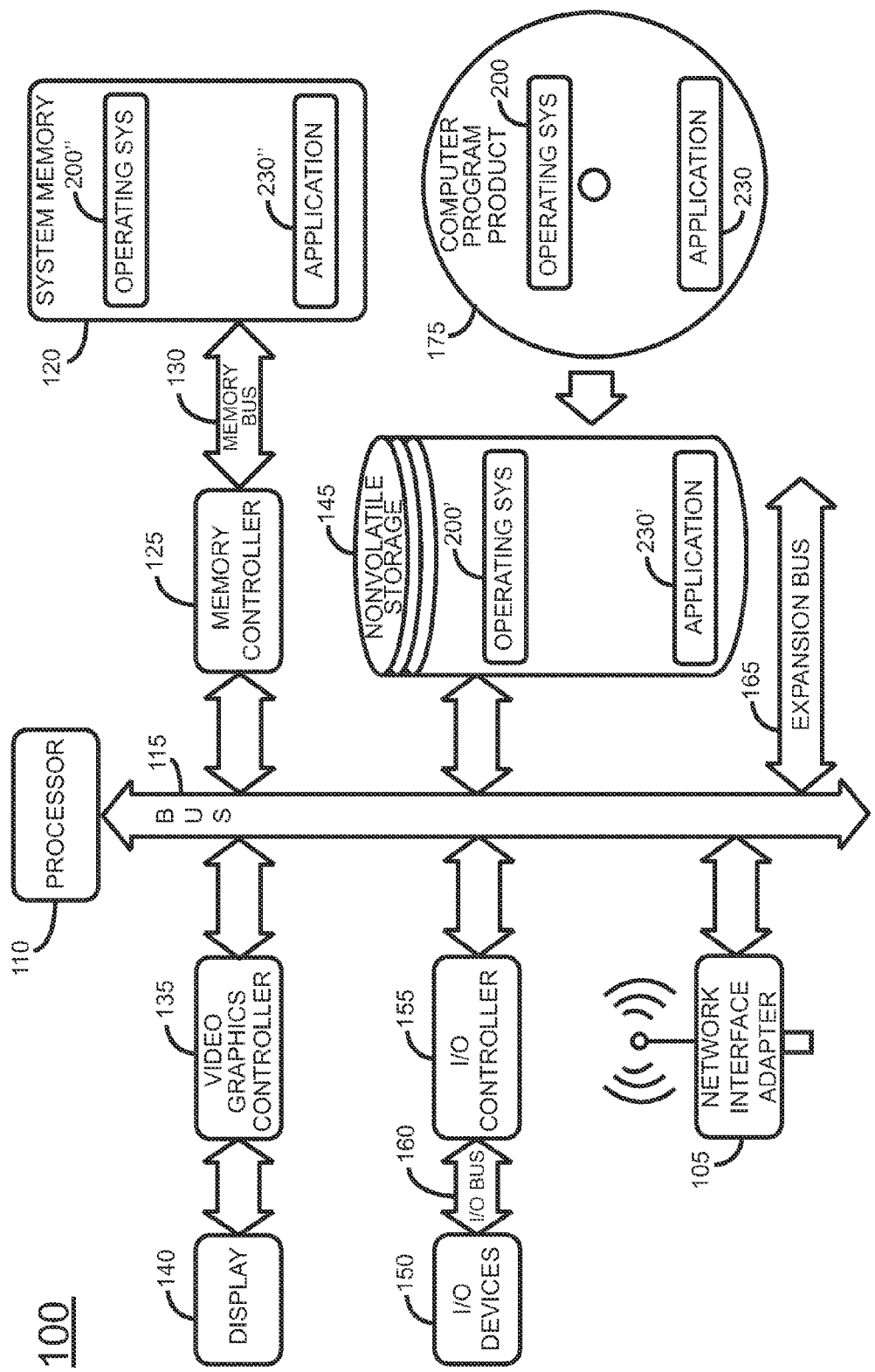
FIG. 1 shows a block diagram of a representative information handling system that employs the disclosed socket naming methodology.

Information handling systems (IHSs) typically employ operating systems that execute applications which include many processes that require execution to accomplish the objectives of the application. These processes may have process identifiers or process IDs associated therewith. It is often useful to know whether a particular process identifier refers to a current process or a stale process. A current process is a process that is currently executing and valid. A stale process is a process which is no longer current or valid. Another process may re-use the process identifier of a process that is stale. It is often helpful to know whether a particular process identifier is current to distinguish the process identifier from a process for which the process identifier is stale and potentially used by another process.

It is possible to determine the process ID (PID) of a process by saving the PID when the process executes or through use of a PID file. However, these approaches may require an exhaustive search of a directory such as a /proc directory to verify if a PID matches a given process. It is possible that the PID may be stale and re-used by another process.

It is desirable to quickly and accurately determine the status of a process, namely whether the process is a current process or a stale process. In one embodiment, the disclosed methodology determines if a particular process is currently executing or running by embedding the process ID (PID) in a pathname bound to a domain socket such as a Unix domain socket or a Linux domain socket. (Unix and Linux are trademarks of their respective trademark holders.) The disclosed method extends the use of sockets, such as Unix domain sockets, to determine if a particular process is running. In one embodiment, the disclosed method initializes an application that launches a particular process. The method then creates a Unix domain socket for the particular process. The method gets or retrieves the process ID (PID) of the particular process that is running. This process is a current process. The method then embeds the process name for the particular process and it respective process ID (PID) into the socket pathname of the Unix domain socket for the particular process. This socket pathname with its embedded name and process ID information is the embedded pathname. In one embodiment, the disclosed method binds the embedded pathname to the Unix domain socket. To determine if the particular process is currently running, the method employs an embedded socket pathname checker that checks the socket pathname in a status file. The method compares the embedded pathname of the particular process with the contents of the socket pathname status file. If the particular process is currently executing, then the embedded pathname of the particular process matches a pathname in the socket pathname status file. However, if the pathname of the particular process does not match a pathname in the socket pathname status file, then the particular process is not currently executing. Using this information, the method outputs or displays an indication of whether the particular process is currently executing or not executing.

FIG. 1 shows an information handling system 100 with an operating system 200 that practices the disclosed process status determination methodology. IHS 100 includes a processor 110 that may include multiple cores. IHS 100 processes, transfers, communicates, modifies, stores or otherwise handles information in digital form, analog form or other form. IHS 100 includes a bus 115 that couples processor 110 to system memory 120 via a memory controller 125 and memory bus 130. In one embodiment, system memory 120 is external to processor 110. System memory 120 may be a static random access memory (SRAM) array or a dynamic random access memory (DRAM) array. Processor 110 may also include local memory (not shown) such as L1 and L2 caches (not shown). A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. I/O devices 150, such as a keyboard and a mouse pointing device, couple to bus 115 via I/O controller 155 and I/O bus 160.

One or more expansion busses 165, such as USB, IEEE 1394 bus, ATA, SATA, PCI, PCIE, DVI, HDMI and other busses, couple to bus 115 to facilitate the connection of peripherals and devices to IHS 100. A network interface adapter 105 couples to bus 115 to enable IHS 100 to connect by wire or wirelessly to a network and other information handling systems. In this embodiment, network interface adapter 105 may also be called a network communication adapter or a network adapter. While FIG. 1 shows one IHS that employs processor 110, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

IHS 100 includes an operating system computer program product on digital media 175 such as a CD, DVD or other media. In one embodiment, a designer or other entity configures the operating system computer program product with an operating system 200 and application 230 to practice the disclosed multicast address handling methodology. Digital media 175 includes application 230 that may launch a process in IHS 100. In practice, IHS 100 may store an operating system 200 (OPERATING SYS) and application 230 on nonvolatile storage 145 as operating system 200' and application 230'. When IHS 100 initializes, the IHS loads operating system 200' into system memory 120 for execution as operating system 200". IHS 100 also loads application 230' into system memory 120 as application 230".

As will be appreciated by one skilled in the art, aspects of the disclosed process status determination methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable medium(s) may be utilized. The computer readable medium may be a a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 3 and 4 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 3 and 4 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 3 and 4 described below.

The flowcharts of FIGS. 3 and 4 illustrate the architecture, functionality, and operation of possible implementations of systems, methods and computer program products that perform network analysis in accordance with various embodiments of the present invention. In this regard, each block in the flowcharts of FIGS. 3 and 4 may represent a module, segment, or portion of code, which comprises one or more executable instructions for implementing the specified logical function(s). It should also be noted that, in some alternative implementations, the functions noted in the block may occur out of the order noted in FIGS. 3 and 4. For example, two blocks shown in succession may, in fact, be executed substantially concurrently, or the blocks may sometimes be executed in the reverse order, depending upon the functionality involved. It will also be noted that each block of FIGS. 3 and 4 and combinations of blocks in the block diagrams and/or flowchart illustration, can be implemented by special purpose hardware-based systems that perform the specified functions or acts, or combinations of special purpose hardware and computer instructions.

Figure 2:
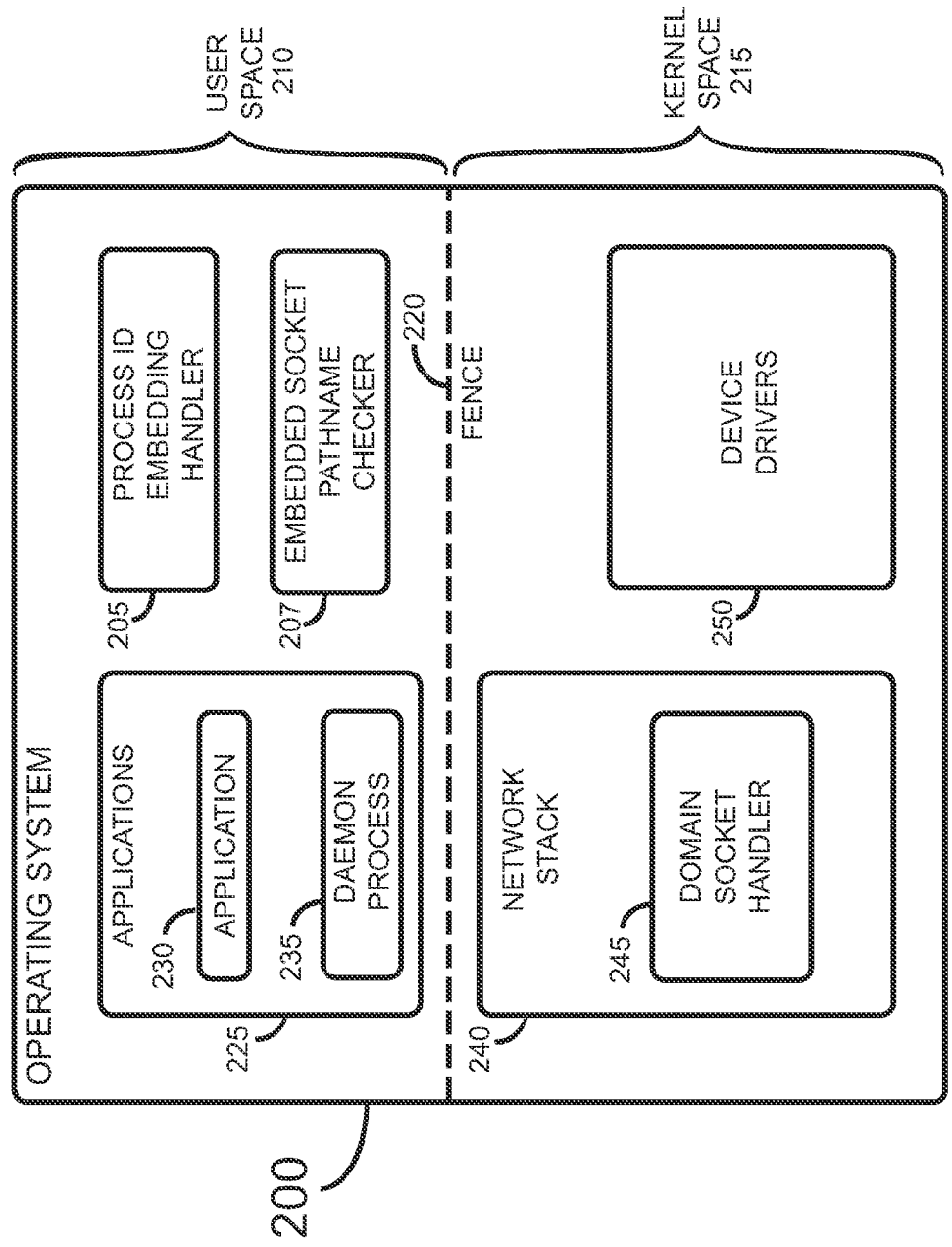
FIG. 2 is a block diagram of an operating system including a process ID embedding handler that employs the disclosed socket naming methodology.

FIG. 2 is a block diagram representation of operating system 200 that a designer or other entity configures with a process ID embedding handler 205 and an embedded socket pathname checker 207 according to the disclosed methodology. Referring to both FIG. 1 and FIG. 2, IHS 100 stores operating system 200 in system memory 120 as operating system 200". Operating system 200 includes user space 210 and kernel space 215. A fence 220 denotes a conceptual boundary between user space 210 and kernel space 215. User space 210 may include one or more applications 225 that execute from user space 210. Applications 225 include an application 230 that initializes, spawns or otherwise launches a daemon process 235.

Kernel space 215 is the protected domain of operating system 200. Kernel space 215 includes a network stack 240. Network stack 240 is a set of protocols that a communications network uses and includes a hierarchy of software layers. Network stack 240 is a layered set of protocols that work together to provide a set of network functions. Communications stack is another term for network stack 240. Network stack 240 includes a domain socket handler 245 that creates a socket, such as a Unix domain socket or Linux domain socket, in response to a request from application 230 or daemon process 235. Domain socket handler 245 may not only create a Unix domain socket, but may also bind a pathname to the Unix domain socket thus created, as explained in more detail below.

Kernel space 215 includes a device driver 250 that acts as a kernel extension. For example, if device driver 250 is a network adapter device driver, then device driver 250 may be a software layer that interfaces operating system 200 to network adapter 105. Device driver 230 enables higher level programs such as application 230 to communicate with network adapter 105, which is a peripheral of IHS 100.

FIG. 3 is a flowchart that shows process flow in one embodiment of the disclosed methodology. IHS 100 loads or launches an application 230. When IHS 100 executes application 230, application 230 initializes or launches daemon process 235, as per block 305 of the flowchart. OS 200 assigns a process ID to each process that application 235 launches or creates. Launching the daemon process 235 occurs in user space 210 of operating system (OS) 200. In response to launching daemon process 235, domain socket handler 245 creates a socket such as a Unix domain socket or Linux domain socket, as per block 310. In one embodiment, the command for creating this socket is "socket(int domain, int type, int protocol)". This creates a local socket or connection such as a communications endpoint in IHS 100. Domain socket handler 245 creates this Unix domain socket in kernel space 245.

In parallel with creation of a respective Unix domain socket for the particular daemon process 235, the process ID embedding handler 205 accesses or gets the process ID that corresponds to the particular daemon process 235, as per block 315. In one embodiment, the command for accessing or getting the process ID of the particular process is "getpid( )". Obtaining the process ID in this manner occurs in user space 210.

Also in parallel with creation of the respective Unix domain socket for the particular daemon process 235, the process ID embedding handler 205 performs two functions. More particularly, process ID embedding handler 205 embeds the process name for the particular daemon process 235 in the socket pathname for the Unix domain socket that corresponds to the particular daemon process. This is the socket pathname for the particular Unix domain socket that "create Unix domain socket" block 310 created for this process. Process ID embedding handler 205 also performs a second function of embedding the process ID retrieved in "get process ID" block 315 into the same socket pathname. In one embodiment, the format of this embedded socket pathname may be "ProcessName_PID.pid", wherein "ProcessName" is the name of the particular daemon process 235 and "PID" is the process ID that the "getpid( )" operation of block 315 obtained for that particular process. In this manner, the embedded socket pathname for the Unix domain socket includes both the process name and PID embedded therein. The get process ID operation of block 315 and the embed process name and PID in socket pathname operations of block 320 all occur in user space 210. Whereas past naming methods may employ arbitrary socket pathnames, the disclosed method employs a non-arbitrary, determined embedded pathname. The actual process name and process ID of the particular daemon process 235 determines the socket pathname that corresponds to the particular daemon process.

As per block 325, OS 200 binds the embedded socket pathname resulting from the embedding operation of block 320 to the Unix domain socket created for the particular daemon process 235 in block 310. Block 325 illustrates this binding operation in kernel space 215 using the representative bind command "bind(int sockfd, const struct sockaddr*my_addr, socklen_t addrlen)". In one embodiment, OS 200 creates and publishes the embedded socket pathname in a particular file accessible by the OS, for example the /proc/net/unix file, if the particular daemon process is currently executing or running. The /proc/net/unix file modified in this manner includes information that allows OS 200 to determine if the particular daemon process 235 is currently executing or running, as described in more detail below in the flowchart of FIG. 4. This /proc/net/unix file may be also be called the socket pathname status file.

FIG. 4 is a flowchart that shows process flow in an embodiment of the disclosed methodology that tests to determine if a particular process is currently executing or running. More specifically, the flowchart of FIG. 4 shows how the embedded socket pathname checker 207 of FIG. 1 tests to determine if the particular daemon process is currently executing or running. In one embodiment, pathname checker 207 accesses and tests a socket pathname status file such as the /proc/net/unix file to determine if that file contains a string matching "ProcessName_PID.pid", namely the socket pathname of the process under test for execution status, as per block 405. Decision block 410 actually conducts this test. If the test determines that the socket pathname of the particular process matches a string that the ProcessName_PID.pid status file stores, then IHS 100 outputs a "process is running" message on display 140, as per block 415. Process flow then continues to block 405 where the method may check the status of another process. However, if in decision block 410, the test determines that the socket pathname of the particular process does not match a string that the ProcessName_PID.pid status file stores, then IHS 100 outputs a "process is not running" message on display 140, as per block 420. Again, process flow may then continue back to block 405 where the method may check the status of yet another process. Thus, the contents of the embedded socket pathname corresponding to the particular process 235 indicate whether the process corresponding to the pathname is currently executing or running. This indicates whether the particular process identifier is current/valid or stale.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of determining process status, comprising:
    executing, by an operating system (OS) of an information handling system (IHS), an application that launches a particular process;
    creating a socket, by the OS of the IHS, in response to the launch of the particular process, thus associating the socket with the particular process;
    activating, a process ID embedding handler, in response to creating the socket, the process ID embedding handler determining a process ID for the particular process, the process ID embedding handler embedding a process name and the process ID in a socket pathname to form an embedded pathname; and
    binding the embedded pathname to the socket.

2. The method of claim 1, further comprising testing the embedded pathname of the socket to determine an execution status of the particular process associated with the socket.

3. The method of claim 2, wherein the testing comprises searching, by an embedded socket pathname checker, a status file to determine if the status file stores the socket pathname of the particular process, the presence of the socket pathname of the particular process in the status file indicating that the particular process is currently executing, the absence of the socket pathname of the particular process in the status file indicating that the particular process is not currently executing.

4. The method of claim 3, further comprising outputting a process is executing indicator and process ID when the particular process is found to be currently executing.

5. The method of claim 3, further comprising outputting a process is not executing indicator and process ID when the particular process is found to be not currently executing.

6. The method of claim 1, wherein the socket comprises one of a UNIX domain socket and a Linux domain socket.

7. The method of claim 1, wherein the particular process is a daemon process.

8. An information handling system (IHS), comprising:
    a processor;
    a memory coupled to the processor, the memory being configured with an application that launches a particular process and creates a socket in response to launch of the particular process, thus associating the socket with the particular process, the memory being further configured with a process ID embedding handler wherein in response to creating the socket the process ID embedding handler determines a process ID for the particular process, the process ID embedding handler embedding a process name and the process ID in a socket pathname to form an embedded pathname, the memory being configured to bind the embedded pathname to the socket.

9. The IHS of claim 8, wherein the memory is further configured to test the embedded pathname of the socket to determine an execution status of the particular process associated with the socket.

10. The IHS of claim 9, wherein the memory is configured with an embedded socket pathname checker that tests a status file to determine if the status file stores the socket pathname of the particular process, the presence of the socket pathname of the particular process in the status file indicating that the particular process is currently executing, the absence of the socket pathname of the particular process in the status file indicating that the particular process is not currently executing.

11. The IHS of claim 10, wherein the embedded socket pathname checker outputs a process is executing indicator and process ID when the particular process is found to be currently executing.

12. The IHS of claim 10, wherein the embedded socket pathname checker outputs a process is not executing indicator and process ID when the particular process is found to be not currently executing.

13. The IHS of claim 8, wherein the socket comprises one of a UNIX domain socket and a Linux domain socket.

14. The IHS of claim 8, wherein the process is a daemon process.

15. A computer program product, comprising:
a computer readable storage medium;
first program instructions that execute an application that launches a particular process;
second program instructions that create a socket in response to the launch of the particular process, thus associating the socket with the particular process;
third program instructions that activate a process ID embedding handler in response to creating the socket, the process ID embedding handler determining a process ID for the particular process, the process ID embedding handler embedding a process name and the process ID in a socket pathname to form an embedded pathname;
fourth program instructions that bind the embedded pathname to the socket,
wherein the first, second, third and fourth program instructions are stored on the computer readable storage medium.

16. The computer program product of claim 15, further comprising fifth program instructions to test the embedded pathname of the socket to determine an execution status of the particular process associated with the socket.

17. The computer program product of claim 16, wherein the fifth program instructions include an embedded socket pathname checker that searches a status file to determine if the status file stores the socket pathname of the particular process, the presence of the socket pathname of the particular process in the status file indicating that the particular process is currently executing, the absence of the socket pathname of the particular process in the status file indicating that the particular process is not currently executing.

18. The computer program product of claim 17, further comprising sixth program instructions that output a process is executing indicator and process ID when the particular process is found to be currently executing.

19. The computer program product of claim 17, further comprising seventh program instructions that output a process is not executing indicator and process ID when the particular process is found to be not currently executing.

20. The computer program product of claim 15, wherein the socket comprises one of a UNIX domain socket and a Linux domain socket.

\* \* \* \* \*